US009609206B2

(12) United States Patent
Nakada

(10) Patent No.: US 9,609,206 B2
(45) Date of Patent: Mar. 28, 2017

(54) IMAGE PROCESSING APPARATUS, METHOD FOR CONTROLLING IMAGE PROCESSING APPARATUS AND STORAGE MEDIUM

(71) Applicant: CANON KABUSHIKI KAISHA, Tokyo (JP)

(72) Inventor: Yuichi Nakada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/673,741

(22) Filed: Mar. 30, 2015

(65) Prior Publication Data

US 2015/0281565 A1 Oct. 1, 2015

(30) Foreign Application Priority Data

Mar. 31, 2014 (JP) ................................ 2014-074576
Feb. 26, 2015 (JP) ................................ 2015-037435

(51) Int. Cl.
*H04N 5/232* (2006.01)
*H04N 9/64* (2006.01)
(Continued)

(52) U.S. Cl.
CPC ....... *H04N 5/23216* (2013.01); *G06F 3/0481* (2013.01); *G06F 3/0488* (2013.01); *G06F 3/04845* (2013.01); *G06T 15/50* (2013.01); *H04N 5/2256* (2013.01); *H04N 5/2351* (2013.01); *H04N 5/23293* (2013.01);
(Continued)

(58) Field of Classification Search
CPC G06F 3/0488; H04N 5/2621; H04N 5/23293; H04N 5/2256
See application file for complete search history.

(56) References Cited

U.S. PATENT DOCUMENTS

| | | | | |
|---|---|---|---|---|
| 6,980,697 | B1 * | 12/2005 | Basso | G06T 7/2033 348/14.01 |
| 2010/0103303 | A1 * | 4/2010 | Lim | G06K 9/00228 348/333.01 |
| 2011/0007086 | A1 | 1/2011 | Kim et al. | |

FOREIGN PATENT DOCUMENTS

| | | | |
|---|---|---|---|
| JP | 4-301304 | A | 10/1992 |
| JP | 2009-267662 | A | 11/2009 |

(Continued)

OTHER PUBLICATIONS

European Application No. 15162017.6-1902, the extended European search report, dated Aug. 13, 2015.

*Primary Examiner* — Ahmed A Berhan
(74) *Attorney, Agent, or Firm* — Canon USA, Inc. I.P. Division

(57) ABSTRACT

An image processing apparatus includes an identification unit configured to identify an object in image data, an acquisition unit configured to acquire position information indicating a position of the object, a setting unit configured to set, based on the position information of the object, a movable range in which a position of the virtual illumination can be set, a specified position acquisition unit configured to acquire a specified position input by a user on a display screen, a determination unit configured to determine the position of the virtual illumination based on the movable range and the specified position, and a lighting processing unit configured to execute lighting processing on the object in the image data based on the position of the virtual illumination determined by the determination unit.

10 Claims, 16 Drawing Sheets

(51) Int. Cl.

| | |
|---|---|
| ***G06F 3/0488*** | (2013.01) |
| ***H04N 5/225*** | (2006.01) |
| ***G06F 3/0481*** | (2013.01) |
| ***H04N 5/262*** | (2006.01) |
| ***G06F 3/0484*** | (2013.01) |
| ***G06T 15/50*** | (2011.01) |
| ***H04N 5/243*** | (2006.01) |
| ***H04N 5/235*** | (2006.01) |

(52) U.S. Cl.
CPC ........... *H04N 5/243* (2013.01); *H04N 5/2621* (2013.01); *H04N 9/646* (2013.01); *G06T 2215/16* (2013.01)

(56) References Cited

FOREIGN PATENT DOCUMENTS

| | | | |
|---|---|---|---|
| JP | 2010-135996 | A | 6/2010 |
| JP | 2013-235537 | A | 11/2013 |
| KR | 10-2010-0047521 | A | 5/2010 |
| KR | 10-1488647 | B1 | 2/2015 |

* cited by examiner

IMAGE PROCESSING APPARATUS, METHOD FOR CONTROLLING IMAGE PROCESSING APPARATUS AND STORAGE MEDIUM

BACKGROUND OF THE INVENTION

Field of the Invention

The present invention relates to image processing for using virtual illumination to generate from a captured image an image that looks as if it had been captured under a desired illumination condition different from the illumination condition of the captured image.

Description of the Related Art

When an image of an object is captured by an imaging apparatus, the captured image significantly varies depending on illumination (light) applied to the object. For example, when a person is an object, a stereoscopic image can be captured under an illumination condition where light is obliquely incident on the object because a shadow on his/her face is emphasized. On the other hand, under an illumination condition such as a back-lighting condition where strong light is incident from the backside of the object, a captured image in which all or a part of the object is darkened by shadows will be acquired. There is provided a method for generating another image that looks as if the object had been captured under an illumination condition desired by the user, by correcting the captured image in which the object is darkened as in the above latter case. According to a method discussed in Japanese Patent Application Laid-Open No. 2009-267662, an image of an object captured under a virtual illumination condition is generated by using model data of the object and the generated image is arranged on an object region within a captured image, so that illumination with respect to the object within the captured image is corrected. In the method, the virtual illumination condition is set by adjusting the brightness of each of a plurality of illumination sources that is previously arranged on predetermined positions.

Further, Japanese Patent Application Laid-Open No. 2010-135996 discusses a method for executing pseudo-lighting processing on a captured image by applying virtual illumination to an object. Specifically, the light intensity of the virtual illumination in the captured image is determined based on a maximum luminance value of the object image. In the method, the Gaussian distribution is deflected according to a preset illumination direction, so that the image in which virtual illumination had been applied to the object from a desired direction can be acquired.

Further, Japanese Patent Application Laid-Open No. 4-301304 discusses a method for displaying an image illuminated by a virtual illumination apparatus, by setting a simulated shape and the position and orientation of the virtual illumination apparatus in an imaging area. In the method, the position and orientation of the virtual illumination apparatus is input, for example, through a keyboard operation.

In a case where the user would like to adjust the illumination for the object in a captured image, the user may change the position and orientation of the virtual illumination until the object is adjusted to a desired state. However, according to the methods discussed in Japanese Patent Application Laid-Open Nos. 2009-267662 and 2010-135996, it is not possible to adjust a three-dimensional position of the virtual illumination. Further, according to the method discussed in Japanese Patent Application Laid-Open No. 4-301304, in order to set the position and orientation of the virtual illumination, the user needs to set coordinate values in x-axis, y-axis, and z-axis directions for representing the position of the virtual illumination and to set rotation amounts around the respective axes for representing the orientation of the virtual illumination. Therefore, the user is required to set a plurality of parameters each time the user adjusts the position and orientation of the virtual illumination.

SUMMARY OF THE INVENTION

The present invention is directed to an image processing apparatus capable of making it easy to quickly and effectively set a position and an orientation of virtual illumination when generating an image from a captured image, so that an object in the captured image, which is reproduced in the generated image, appears in the generated image looking as if it had been captured under the virtual illumination condition.

According to an aspect of the present invention, an image processing apparatus for using virtual illumination to perform lighting processing on image data displayed on a display screen includes an identification unit configured to identify an object in the image data, an acquisition unit configured to acquire position information indicating a position of the object, a setting unit configured to set, based on the position information of the object, a movable range in which a position of the virtual illumination can be set, a specified position acquisition unit configured to acquire a specified position input by a user on the display screen, a determination unit configured to determine the position of the virtual illumination based on the movable range and the specified position, and a lighting processing unit configured to perform lighting processing on the object in the image data based on the position of the virtual illumination determined by the determination unit.

Further features of the present invention will become apparent from the following description of exemplary embodiments (with reference to the attached drawings).

DESCRIPTION OF THE EMBODIMENTS

Exemplary embodiments of the present invention will be described below with reference to the drawings. Configurations described in the below-described exemplary embodiments are merely examples, and the present invention is not limited to the configurations described therein.

<External View of Imaging Apparatus>

Figure 1:
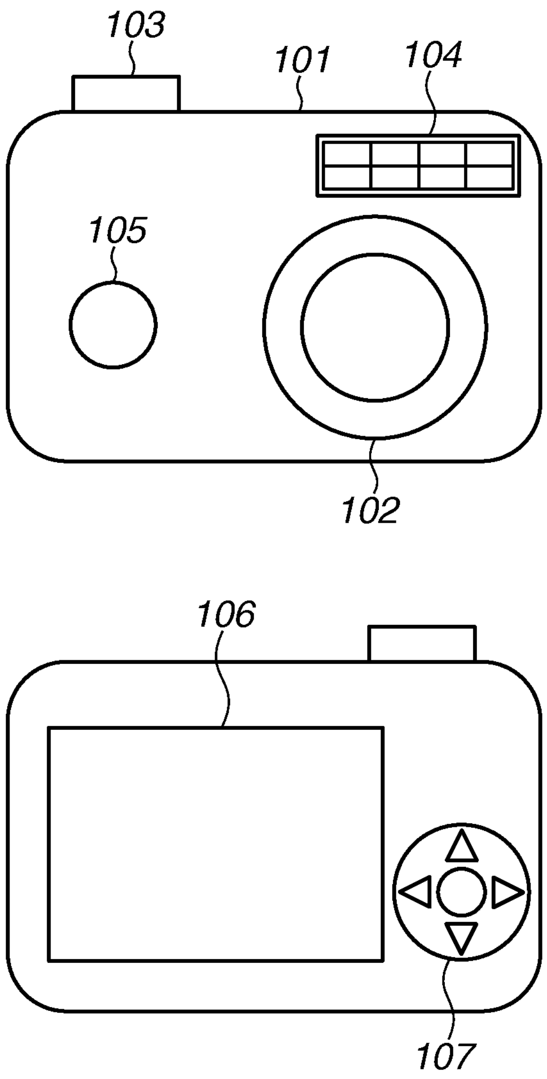
FIG. 1 is a diagram illustrating external views of an image processing apparatus according to a first exemplary embodiment.

FIG. 1 illustrates external views of an imaging apparatus applicable to a first exemplary embodiment of the present invention. In the present exemplary embodiment, a configuration of a digital camera will be described as an example of a configuration of the imaging apparatus. Although the digital camera will be described below, the imaging apparatus is not limited thereto. For example, the imaging apparatus may be an information processing apparatus such as a mobile phone, a tablet-type device, or a personal computer, or may be configured as an imaging apparatus such as a mobile phone with a built-in camera. FIG. 1 shows an external front view of the imaging apparatus (see top (first) view in FIG. 1), and shows an external back view thereof (see bottom (second) view in FIG. 1). An imaging apparatus 101 includes an optical unit 102, an image-capturing button 103, a flash 104, a distance image acquisition unit 105, a display unit 106, and an operation button 107.

The optical unit 102 is a lens barrel configured of a zoom lens, a focus lens, a camera-shake correction lens, a diaphragm, and a shutter, and collects optical information of an object. The image-capturing button 103 is used when a user provides an instruction for starting an image capturing operation to the imaging apparatus 101. The flash 104 emits light concurrently with the start of the image capturing operation according to the instruction from the user. The distance image acquisition unit 105 acquires distance image data of the object according to the image-capturing instruction. In the present exemplary embodiment, the distance image data retains information indicating a distance to the object from the imaging apparatus 101.

The display unit 106 displays image data processed by the imaging apparatus 101 and various kinds of other data. A liquid crystal display is used for the display unit 106, for example. In the present exemplary embodiment, because the imaging apparatus 101 is not provided with an optical finder, the user performs framing operations (e.g., checking focus and composition) by using the display unit 106. Because the user captures an image while checking a live-view image displayed on the display unit 106, the display unit 106 functions as an electronic finder while the user performs such framing and focusing operations. Further, the display unit 106 displays a camera setting menu in addition to performing live-view display in which an imaging area is displayed on a real-time basis.

The operation button 107 is used to acquire an operation of the user. Specifically, with respect to the camera setting menu displayed on the display unit 106, the user uses the operation button 107 to input an instruction for changing an image-capturing mode or setting various parameters for an image capturing operation. Further, in the present exemplary embodiment, the imaging apparatus 101 includes a lighting processing mode as the image capturing mode. By using either the operation button 107 or the image-capturing button 103, the user can input an instruction for changing the lighting processing mode, setting illumination parameters, changing a distance image data output mode, or selecting an object region, for example. Further, the display unit 106 may be provided with a touch-screen function. In this case, an instruction input by the user through the touch-screen can be also taken as an instruction input through the operation button 107.

<Internal Configuration of Imaging Apparatus>

Figure 2:
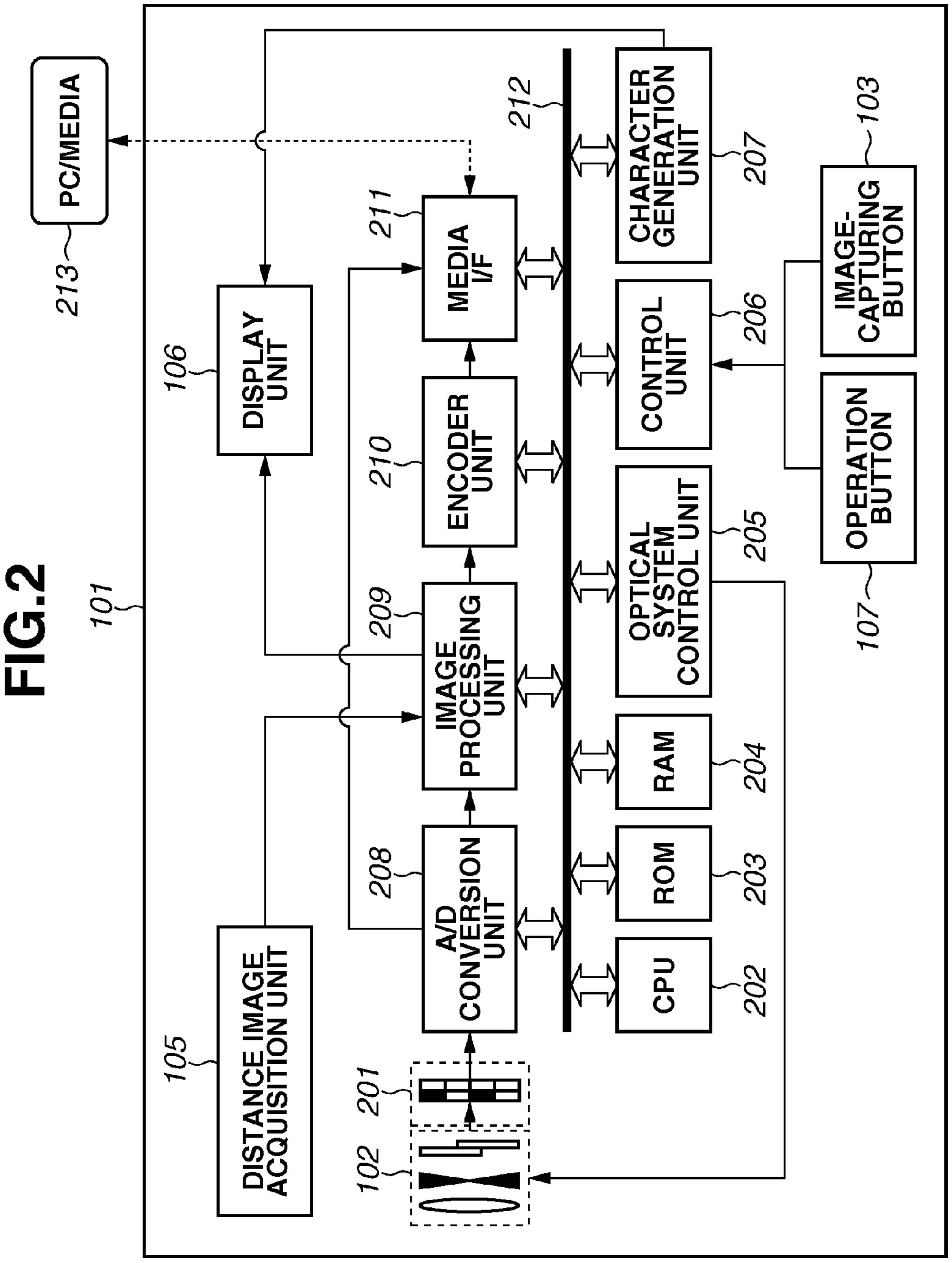
FIG. 2 is a diagram illustrating an internal configuration of the image processing apparatus according to the first exemplary embodiment.

FIG. 2 is a block diagram illustrating an internal configuration of the imaging apparatus 101 according to the present exemplary embodiment. A central processing unit (CPU) 202 executes processing of respective configurations. The CPU 202 executes the processing of the respective configurations according to a result obtained by sequentially reading and analyzing the instructions stored in a read only memory (ROM) 203 or a random access memory (RAM) 204. A system bus 212 transmits and receives data.

According to an instruction input by the user through the image-capturing button 103 or the operation button 107, the control unit 206 controls the image capturing operation, the change of the lighting processing mode, the selection of an object region, and the setting of the illumination parameters. In the present exemplary embodiment, the control unit 206 controls flags SW1, SW2, SW3, and SW4 according to an instruction from the user. The flag SW1 is turned ON when the control unit 206 is instructed to enable the lighting processing, and turned OFF when the control unit 206 is instructed to disable the lighting processing. The flag SW2 is turned ON when the control unit 206 is instructed to move virtual illumination, and turned OFF when the control unit 206 is instructed not to move the virtual illumination. The flag SW3 is turned ON when the control unit 206 is instructed to save distance image data, and turned OFF when the control unit 206 is instructed not to save the distance image data. The flag SW4 is turned ON when the control unit 206 is instructed to save a corrected image, and turned OFF for other occasions. Practically, each of the flags SW1, SW2, SW3, and SW4 is a bit signal within the RAM 204. The flag is OFF when a state of the bit signal is 0, whereas the flag is ON when the state thereof is 1. The control unit 206 thus switches the state of the bit signal. Further, the control unit 206 acquires the operation of the user.

An optical system control unit 205 controls the optical unit 102 to adjust a focus, open a shutter, or adjust a diaphragm according to an instruction from the CPU 202.

A color image sensor unit 201 converts optical information collected by the optical unit 102 into a current value. Color information is acquired by combining the color image sensor unit 201 with a color filter.

The distance image acquisition unit 105 includes an infrared light emitting unit for emitting infrared light and a light receiving unit for receiving the infrared light reflected on the object. The distance image acquisition unit 105 calculates a value of a distance between the imaging apparatus 101 and the object based on the time taken for the light receiving unit to receive the infrared light that is emitted and reflected on the object. Then, based on the distance image capturing information, including the calculated distance value and the number of sensor pixels and field angle of the light receiving unit, the distance image acquisition unit 105 calculates the position information of the object and acquires that position information as distance image data.

An analog/digital (A/D) conversion unit 208 converts a light amount of the object detected by the optical unit 102 into a digital signal value in order to acquire raw image data. In the present exemplary embodiment, distance image data and raw image data captured at the same time can be acquired.

An image processing unit 209 executes development processing on the raw image data to generate color image data. The image processing unit 209 executes various kinds of image processing on the color image data. In the present exemplary embodiment, the image processing unit 209 executes lighting processing in which the color image data is converted into lighting corrected image data based on the color image data and the distance image data. An internal configuration of the image processing unit 209 will be described in detail below.

A character generation unit 207 generates a text and a graphic. The text and the graphic generated by the character generation unit 207 are superimposed on the lighting corrected image data generated by the image processing unit 209, so as to be displayed on the display unit 106.

An encoder unit 210 executes file format conversion processing in which various kinds of image data including the color image data processed by the image processing unit 209 and the lighting corrected image data generated by the lighting processing are converted into a file format such as a joint photographic experts group (JPEG) format.

A media I/F 211 serves as an interface for transmitting/receiving image data to/from a personal computer (PC)/media 213 such as a hard disk, a memory card, a compact flash (CF) card, or a secure digital (SD) card.

<Internal Configuration of Image Processing Unit>

Figure 3:
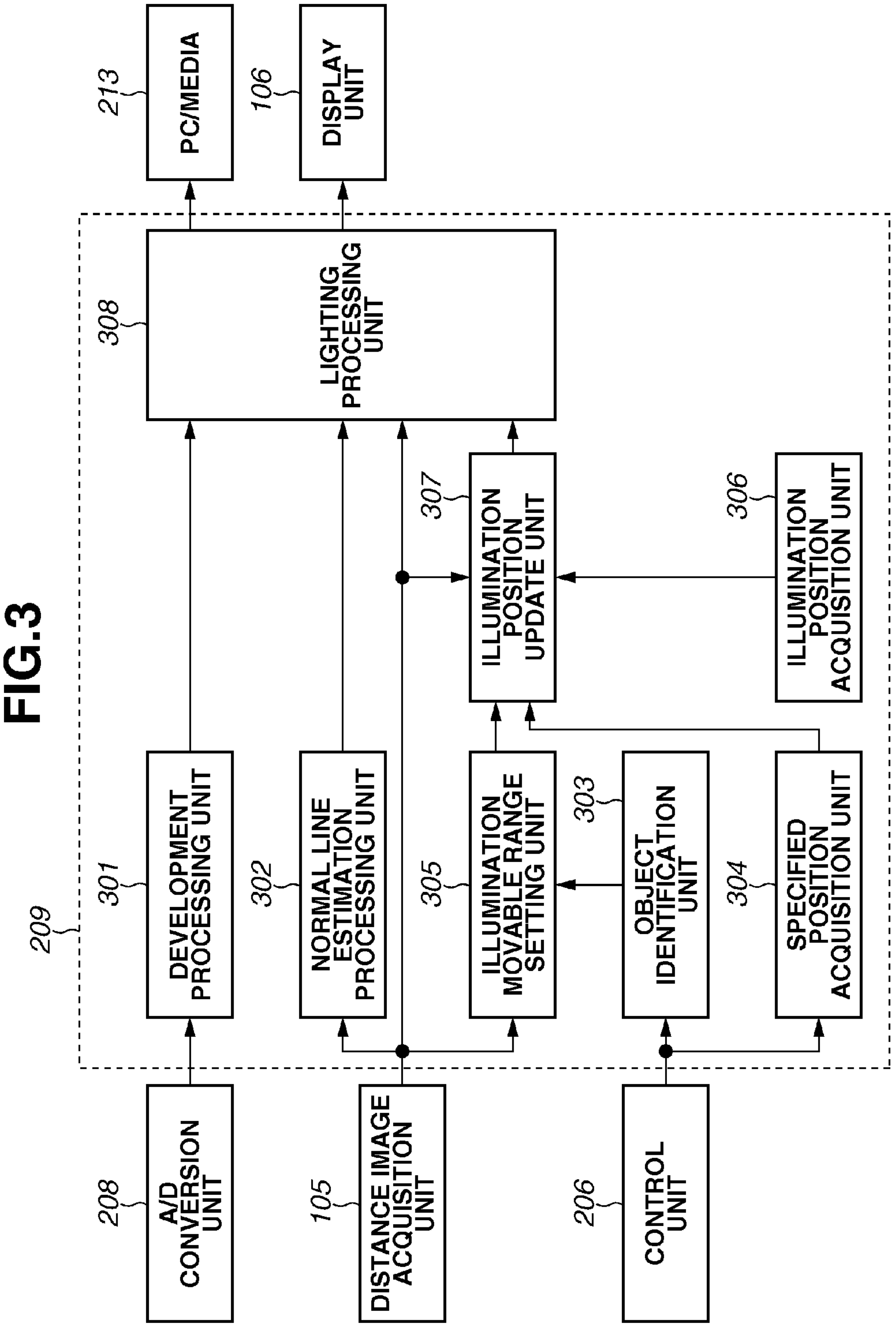
FIG. 3 is a block diagram illustrating a configuration of an image processing unit according to the first exemplary embodiment.

FIG. 3 is a block diagram illustrating a detailed internal configuration of the image processing unit 209 according to the present exemplary embodiment.

A development processing unit 301 acquires raw image data from the A/D conversion unit 208. Then, the development processing unit 301 generates color image data by executing white balance processing, de-mosaic processing, noise reduction processing, color conversion processing, edge emphasis processing, and gamma processing on the raw image data. The generated color image data can be output and displayed on the display unit 106, or stored in a storage device such as the RAM 204 or the PC/media 213. In the present exemplary embodiment, red-blue-green (RGB) values serving as pixel values are stored in a pixel I (i, j) which constitutes color image data I. The RGB values stored in each pixel of color image data 501 are expressed as Ir (i, j), Ig (i, j), and Ib (i, j), respectively. Further, coordinate values of each object using the imaging apparatus 101 as a reference, which serve as pixel values, are stored in a pixel D (i, j) which constitutes distance image data D acquired by the distance image acquisition unit 105. The coordinate values stored in the pixel D (i, j) of the distance image data D are expressed as x (i, j), y (i, j), and z (i, j). Herein, an x-axis corresponds to a direction horizontal to the imaging apparatus 101, a y-axis corresponds to a direction vertical to the imaging apparatus 101, and a z-axis corresponds to an optical axis direction of the imaging apparatus 101. The color image data I is associated with each pixel of the distance image data D. More specifically, the coordinate values associated with the pixel I (i, j) of the color image data I are stored in the pixel D (i, j) of the distance image data D.

A normal line estimation processing unit 302 acquires normal line image data by estimating a normal vector for each pixel in the distance image data D based on the distance image data D acquired from the distance image acquisition unit 105. Values for respective elements of a normal unit vector serving as pixel values are stored in a pixel N (i, j) of normal line image data N. More specifically, the values of x, y, and z components of the normal vector corresponding to the pixel I (i, j) of the color image data I are stored in the pixel N (i, j), and expressed as Nx (i, j), Ny (i, j), and Nz (i, j), respectively.

An object identification unit 303 acquires a selected object position P0' from the control unit 206 that receives the operation of selecting the object input by the user. Then, the object identification unit 303 calculates an object position P0 in the color image data based on the selected object position P0'. In the present exemplary embodiment, the color image data is displayed on the display unit 106 having a touch screen function to receive an operation of touching an object on the display screen executed by the user, so that the object identification unit 303 acquires the touched position as the selected object position P0'. In this case, the selected object position P0' corresponds to a pixel position on the display unit 106. The object identification unit 303 calculates the object position P0 by converting the pixel position on the display unit 106 into the pixel position in the color image data.

A specified position acquisition unit 304 acquires a specified position of the illumination from the control unit 206 that receives the operation of changing a light source position input by the user. In the present exemplary embodiment, the color image data is displayed on the display unit 106 having a touch screen function to receive a drag operation of the user input to the display screen. The specified position acquisition unit 304 acquires specified positions including at least a press-start position P1' and a press-end position P2' according to the drag operation of the user.

Figure 6:
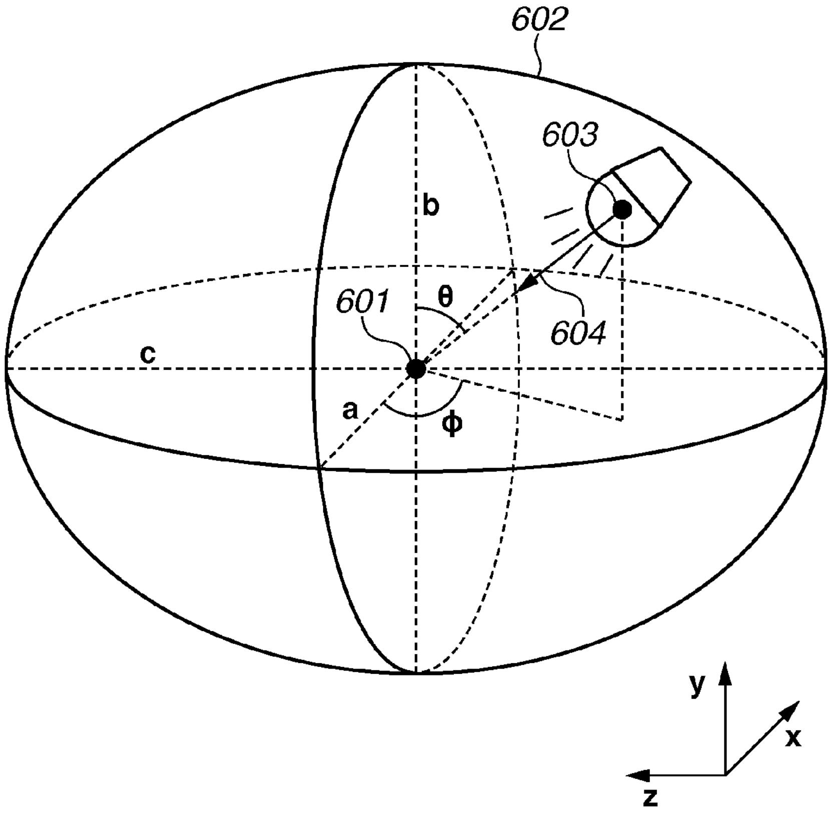
FIG. 6 is a diagram illustrating a method for controlling a position of illumination according to the first exemplary embodiment.

An illumination movable range setting unit 305 acquires the distance image data from the distance image acquisition unit 105 and the object position from the object identification unit 303. Then, based on the object position, the illumination movable range setting unit 305 sets a movable range of virtual illumination for illuminating the object in the color image data. In the present exemplary embodiment, the illumination moves on an ellipsoid 602 having a rotation center C=(Cx, Cy, Cz) 601 as the center, as illustrated in FIG. 6. In this case, a position Q=(Qx, Qy, Qz) 603 of the illumination follows the following formula (1).

$$\frac{(Q_x - C_x)^2}{a^2} + \frac{(Q_y - C_y)^2}{b^2} + \frac{(Q_z - C_z)^2}{c^2} = 1 \quad (1)$$

Herein, "a" represents a radius in the x-axis direction, "b" represents a radius in the y-axis direction, and "c" represents a radius in the z-axis direction. Further, the position Q 603 of the illumination is expressed by the following formula (2) when a rotation angle around the Z-axis is θ whereas a rotation angle around the x-axis is ϕ.

$$Q_x = C_x - a \sin\theta \cos\phi$$

$$Q_y = C_y + b \cos\theta$$

$$Q_z = C_z - c \sin\theta \sin\phi \quad (2)$$

Further, an orientation U=(Ux, Uy, Uz) 604 of the illumination is expressed by the following formula (3) as a unit vector heading toward the rotation center C 601 from the position Q 603 of the illumination.

$$U = \frac{C - Q}{|C - Q|} \quad (3)$$

In the present exemplary embodiment, the rotation center C is set based on the coordinate values in a periphery of the object position P0 acquired from the distance image data. In the formula (2), each of the values a, b, and c is set in advance. Further, according to the operation of the user, the rotation angle θ around the z-axis and the rotation angle ϕ around the x-axis are updated in order to change the position Q and the orientation U of the illumination.

An illumination position acquisition unit 306 acquires, for example, from the RAM 204 the rotation angles θ and ϕ which represent the position Q of the illumination.

An illumination position update unit 307 acquires the distance image data from the distance image acquisition unit 105, the rotation center C and rotation radius of the illumination from the illumination movable range setting unit 305, the rotation angles θ and ϕ from the illumination position acquisition unit 306, and the position specified by the user from the specified position acquisition unit 304. Then, the illumination position update unit 307 updates the rotation angles θ and ϕ based on the specified position. Thereafter, the illumination position update unit 307 updates the position Q of the illumination in accordance with the formula (2), and updates the orientation U of the illumination in accordance with the formula (3).

A lighting processing unit 308 generates a lighting corrected image by adding a virtual light source to the processing-target color image data based on the distance image data, the normal line image data, the position Q of the illumination, and the orientation U of the illumination. The generated lighting corrected image can be output and stored in a storage device such as the RAM 204 or the PC/media 213, or output and displayed on the display unit 106.

<Processing Flow of Image Processing Unit>

Figure 4:
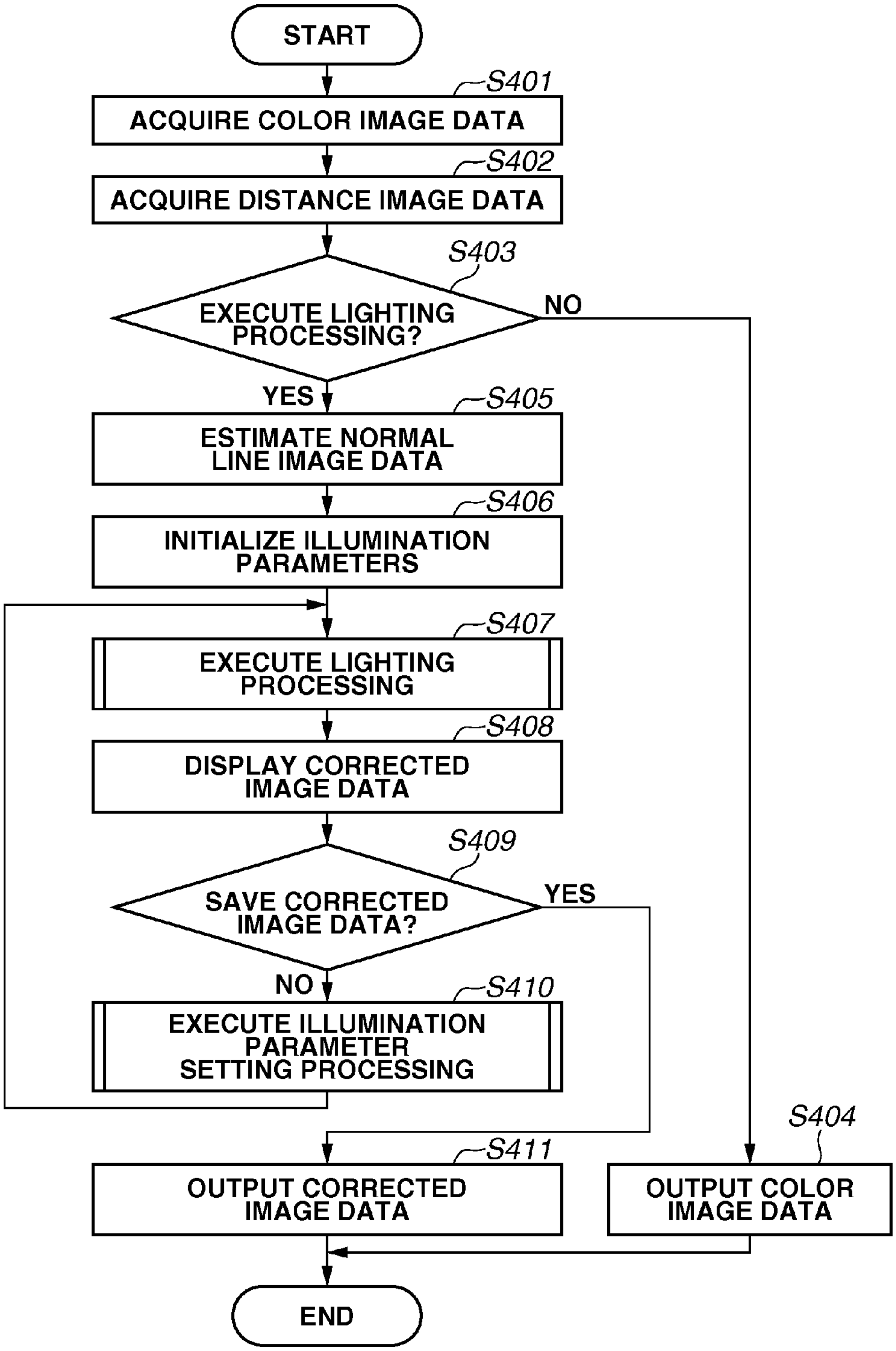
FIG. 4 is a flowchart illustrating a flow of processing according to the first exemplary embodiment.

FIG. 4 is a flowchart illustrating an operation procedure of the image processing unit 209 of the imaging apparatus 101 according to the present exemplary embodiment. First, the image processing unit 209 according to the present exemplary embodiment acquires normal line image data by estimating a normal line for each pixel based on the distance image data. Then, the image processing unit 209 sets the illumination parameters based on the operation of the user and the distance image data. At this time, a lighting corrected image generated based on the illumination parameters is displayed on the display unit 106, so that the user can change the illumination parameters while checking a change in the lighting corrected image.

In the present exemplary embodiment, two illumination sources can be set. Further, the illumination parameters include variables for representing activated illumination, the arrangement state of the illumination, the on/off state of the illumination, the colors of the illumination, and the brightness of the illumination, and variables for controlling the position and orientation of the illumination. When a variable SW_L1 which represents the arrangement state of the illumination is ON, this indicates that the illumination is arranged, whereas when the variable SW_L1 is OFF, this indicates that the illumination is not arranged. When a variable SW_L2 which represents the on/off state of the illumination is ON, this indicates that the illumination is turned on, whereas when the variable SW_L2 is OFF, this indicates that the illumination is turned off. The colors of the illumination are expressed by the RGB values, and represented by variables Lr, Lg, and Lb, respectively. A variable α represents the brightness of the illumination, and the illumination becomes brighter as the variable α increases. Hereinafter, the operation will be described according to each processing step.

Figure 5:
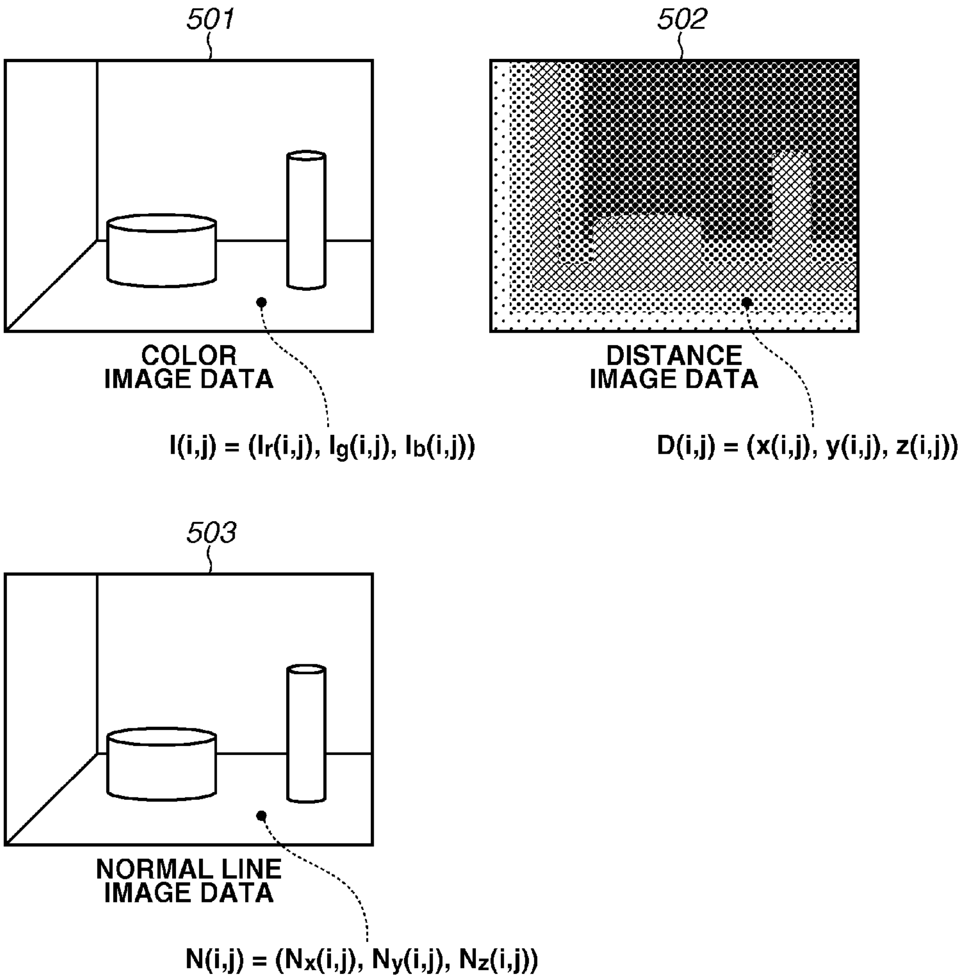
FIG. 5 illustrates an example of image data according to the first exemplary embodiment.

In step S401, the development processing unit 301 generates color image data based on the raw image data acquired from the A/D conversion unit 208. FIG. 5 illustrates an example of the color image data 501. The method for acquiring the color image data is not limited to the above. For example, the development processing unit 301 may generate color image data by acquiring the raw image data stored in the RAM 204 or the PC/media 213. Alternatively, the development processing unit 301 may acquire the color image data stored in the RAM 204 or the PC/media 213.

In step S402, the lighting processing unit 308 acquires distance image data from the distance image acquisition unit 105. FIG. 5 illustrates an example of distance image data 502. The method for acquiring the distance image data is not limited to the above. For example, the lighting processing unit 308 may acquire distance image data stored in the RAM 204 or the PC/media 213.

In step S403, the lighting processing unit 308 acquires a state of the flag SW1 from the RAM 204. Based on the state of the flag SW1, the lighting processing unit 308 determines whether to execute the lighting processing. In a case where the flag SW1 is OFF according to an instruction from the user (NO in step S403), the lighting processing unit 308 determines not to execute the lighting processing, and the processing proceeds to step S404. On the other hand, in a case where the flag SW1 is ON (YES in step S403), the lighting processing unit 308 determines to execute the lighting processing, and the processing proceeds to step S405.

In step S404, the lighting processing unit 308 acquires a state of the flag SW3 from the RAM 204. The lighting processing unit 308 outputs and stores only the color image data in the PC/media 213 when the flag SW3 is OFF according to the instruction from the user, while outputting and storing the color image data and the distance image data in the PC/media 213 when the flag SW3 is ON. Alternatively, the above-described image data may be output and displayed on the display unit 106. Thereafter, the lighting processing unit 308 ends the processing.

In step S405, the normal line estimation processing unit 302 acquires the distance image data from the distance image acquisition unit 105. Then, the normal line estimation processing unit 302 acquires the normal line image data N by estimating the normal vector for each pixel based on the distance image data. FIG. 5 illustrates an example of normal line image data 503. The normal vector can be estimated, for example, by performing differentiation with respect to a target pixel of the distance image data based on a proximal region thereof, or by fitting a plane thereinto. In the present exemplary embodiment, a vector vertical to a plane fitted into the proximal region of the target pixel will be acquired as the normal line.

In step S406, the lighting processing unit 308 initializes the illumination parameters. More specifically, in order to put all the illumination sources into the off state, the lighting processing unit 308 turns OFF the variables SW_L1 and SW_L2 for all the illumination sources. Then, the lighting processing unit 308 activates one of the two illumination sources that can be set.

Further, the lighting processing unit 308 sets the rotation angles θ and ϕ of the illumination to initial values. In the present exemplary embodiment, the rotation angles θ=90° and ϕ=90° of the illumination are set as the initial values, so that a state in which the object is illuminated from the front side thereof can be set as the initial state.

In step S407, the lighting processing unit 308 executes the lighting processing on the color image data. By executing the lighting processing, an image that looks as if the object had been captured under the illumination condition indicated by the set illumination parameters can be generated. In a case where the processing proceeds to step S407 from step S406, the processing-target image data is the color image data. In this case, the illumination parameters are the initial values set in step S406. Further, in a case where the processing proceeds to step S407 from step S410 described below, the lighting processing unit 308 executes the lighting processing by using the illumination parameters set in step S410 instead of the initial values set in step S406. The lighting processing unit 308 generates corrected image data by executing the lighting processing based on the color image data, the distance image data, the normal line image data, and the illumination parameters. The processing executed in step S407 will be described in detail below.

In step S408, the lighting processing unit 308 outputs and displays the corrected image data on the display unit 106.

In step S409, the lighting processing unit 308 acquires from the RAM 204 a state of the flag SW4 indicating whether to save the corrected image. In a case where the flag SW4 is set to OFF according to the instruction from the user (NO in step S409), the processing proceeds to step S410. In a case where the flag SW4 is set to ON (YES in step S409), the processing proceeds to step S411.

In step S410, the illumination position update unit 307 executes the illumination parameter setting processing according to a selected region selected by the operation of the user, and sets the illumination parameters. The user selects a desired position on the corrected image data while monitoring the corrected image data displayed on the display unit 106, so that the user can move the illumination to the selected position. A method for setting the illumination parameters will be described below in detail.

In step S411, the lighting processing unit 308 acquires a state of the flag SW3 from the RAM 204. Then, the lighting processing unit 308 outputs and stores the corrected image data and the color image data in the PC/media 213 when the flag SW3 is OFF, while outputting and storing the corrected image data, the color image data, and the distance image data in the PC/media 213 when the flag SW3 is ON. Thereafter, the lighting processing unit 308 ends the processing.

Figure 7:
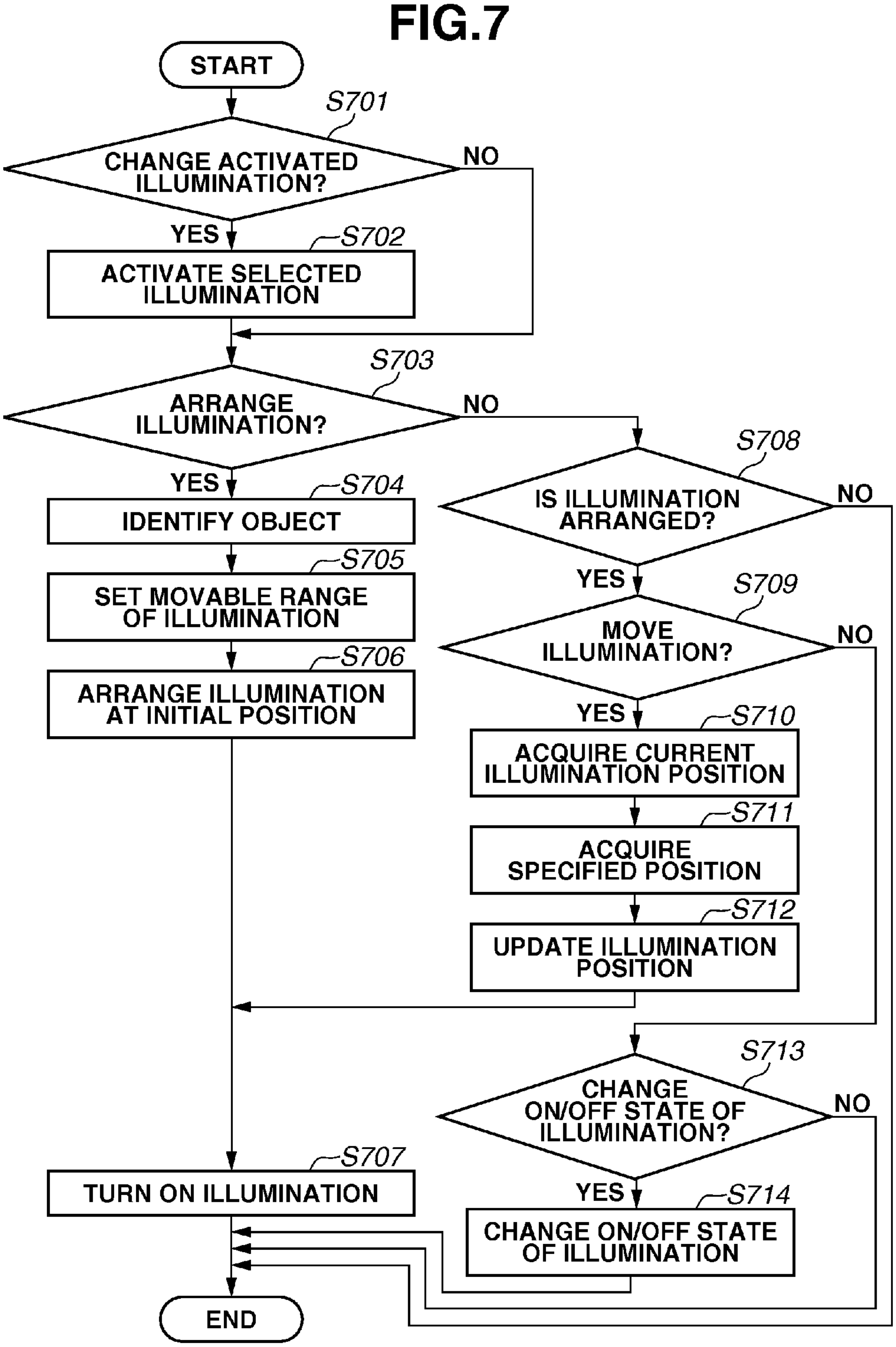
FIG. 7 is a flowchart illustrating a flow of processing for setting illumination parameters according to the first exemplary embodiment.

Herein, in FIG. 7, the illumination parameter setting processing executed in step S410 will be described in detail. In the illumination parameter setting processing according to the present exemplary embodiment, the illumination parameters are set based on the operation of the user and the distance image data. In the present exemplary embodiment, the user executes the operation for changing the position of the illumination while monitoring the displayed corrected image data. The position of the illumination is updated by the illumination position update unit 307 based on, for example, the distance image data D and the specified position. At this time, the illumination position update unit 307 determines a moving amount of the illumination according to a position of the object selected as a target of the lighting processing. Hereinafter, the illumination parameter setting processing will be described in detail.

In step S701, the illumination position update unit 307 determines whether the user has provided an instruction for changing the activated illumination. In a case where the activated illumination is to be changed (YES in step S701), the processing proceeds to step S702. In a case where the activated illumination is not to be changed (NO in step S701), the processing proceeds to step S703.

In step S702, the illumination position update unit 307 activates the illumination selected in step S701. Below-described operations are applicable to the illumination parameters of the illumination activated in step S702.

In step S703, the illumination position update unit 307 further determines whether to arrange the illumination based on the operation of the user. In a case where the illumination is to be arranged (YES in step S703), the processing proceeds to step S704. In a case where the illumination is not to be arranged (NO in step S703), the processing proceeds to step S708.

Figure 8:
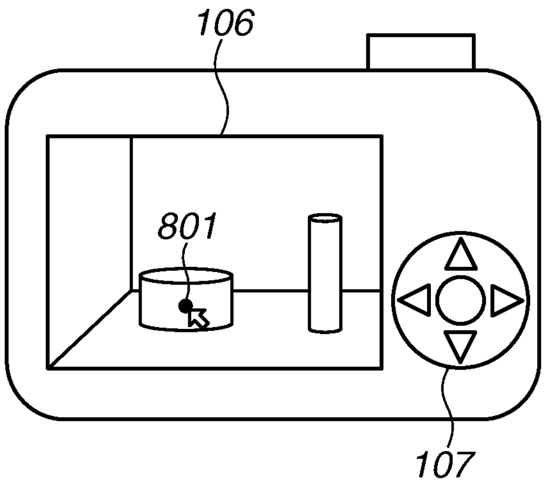
FIG. 8 is a diagram illustrating an example of a selected region according to the first exemplary embodiment.
Figure 8:
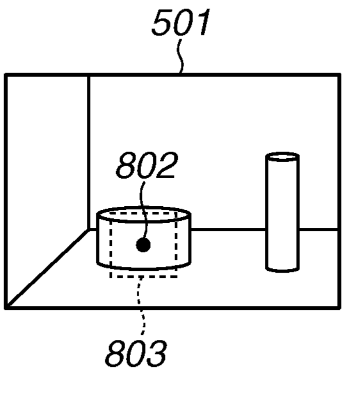

In step S704, the object identification unit 303 acquires the selected object position P0' from the control unit 206. In the present exemplary embodiment, the user selects an object from the corrected image displayed on the display unit 106 in step S408. The user executes the operation for specifying an object for which the user would like to adjust the degree of illumination applied. A method for acquiring a selected region will be described with reference to FIG. 8. First, the object identification unit 303 acquires from the control unit 206 the selected object position P0' (801) on the display unit 106 selected by the operation of the user. Then, the object identification unit 303 calculates the object position P0 (802) as a coordinate value on the corrected image data corresponding to the selected object position P0'. Thereafter, a proximal region including the object position P0 at the center is specified as an object proximal region 803. The object proximal region 803 is set as a rectangular region having the object position 802 at the center, for example.

Figure 9:
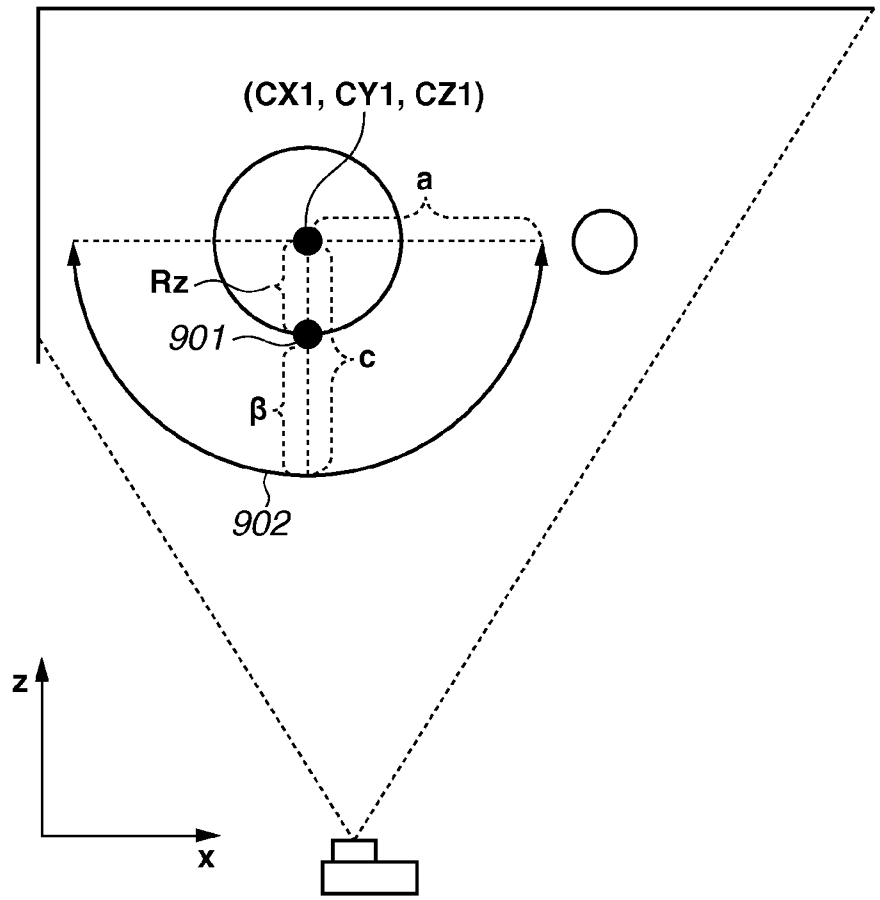
FIG. 9 is a diagram illustrating an example of a method for setting the illumination parameters according to the first exemplary embodiment.

In step S705, the illumination movable range setting unit 305 first sets illumination parameters Cx, Cy, Cz, a, b, and c for representing the movable range of the illumination. A method for setting the illumination parameters will be described with reference to FIG. 9. First, the illumination movable range setting unit 305 acquires from the distance image data 502 an object coordinate value 901 corresponding to the object position P0 (i, j) 802. Each illumination parameter is calculated from the object coordinate value 901 and a predetermined curvature radius (Rx, Ry, Rz) of the object according to the following formula (4).

$$
\begin{aligned}
C_x &= x(i,j)\\
C_y &= y(i,j)\\
C_z &= z(i,j)+Rz\\
a &= Rx+\beta\\
b &= Ry+\beta\\
c &= Rz+\beta
\end{aligned}
\tag{4}
$$

Accordingly, a size of the movable range of the illumination (i.e., a size of the ellipsoid) is set based on the size of the object. Herein, a variable β represents an approximate distance between the position of the object and the position of the illumination. A value of the variable β may be set in advance, or may be changed according to the pixel value of the object proximal region 803. For example, a small value is set to the variable β when a captured object image is dark and the pixel value of a group of pixels corresponding to the object is small, whereas a large value is set to the variable β when the captured object image is bright and the pixel value of a group of pixels corresponding to the object is large. With this configuration, the illumination can be arranged at a closer position for a darker object image, and thus the correction effect of the illumination can be increased. Alternatively, the variable β may be changed according to the brightness α of the illumination. For example, the variable β may be set to be greater as the brightness α of the illumination increases.

By the above-described processing, a moving region of the virtual illumination for illuminating a specified object is set. With the illumination parameters determined above, a moving range of the virtual illumination for illuminating a specified object is set, and the lighting correction with respect to the object can be executed by changing the position and orientation of the virtual illumination.

In step S706, the illumination position update unit 307 arranges the illumination at the initial position based on the rotation angles α, and ϕ of the illumination and the illumination parameters Cx, Cy, Cz, a, b, and c. More specifically, the illumination position update unit 307 calculates the position Q of the illumination according to the formula (2), and calculates the orientation U of the illumination according to the formula (3). Then, the illumination position update unit 307 turns ON the variable SW_L1 to arrange the illumination.

Figure 10:
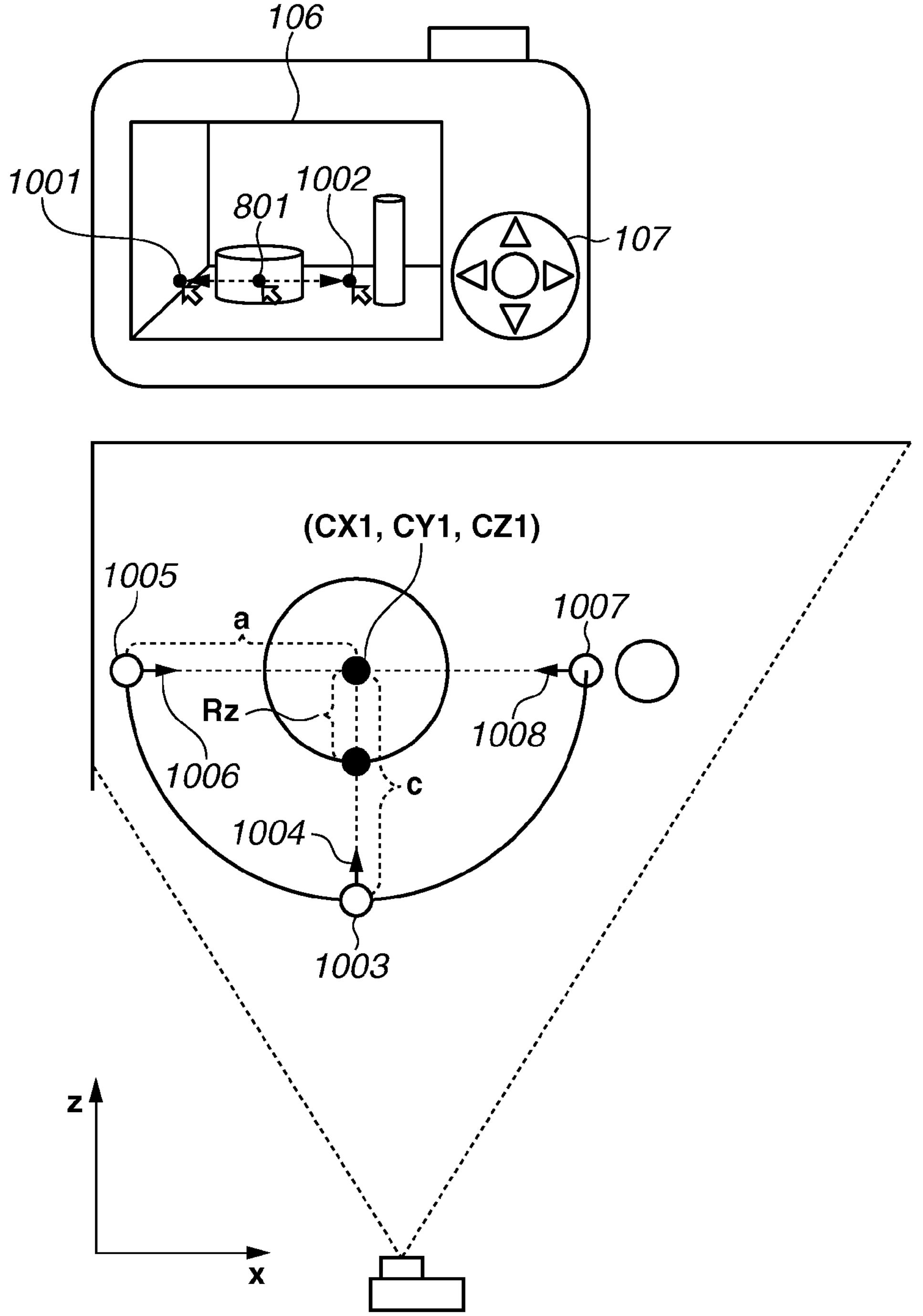
FIG. 10 is a diagram illustrating an example of a method for moving the illumination parameters according to the first exemplary embodiment.

FIG. 10 is a diagram illustrating an initial position 1003 and an initial orientation 1004 of the illumination corresponding to the selected object position P0' (801).

In step S707, the illumination position update unit 307 turns on the illumination by turning ON the variable SW_L2 and ends the illumination parameter setting processing.

In step S708, the illumination position update unit 307 determines whether the illumination is arranged. More specifically, the illumination position update unit 307 acquires a state of the variable SW_L1 of the activated illumination. In a case where the variable SW_L1 is ON (YES in step S708), the processing proceeds to step S709. In a case where the variable SW_L1 is OFF (NO in step S708), the illumination position update unit 307 ends the illumination parameter setting processing.

In step S709, the illumination position update unit 307 determines whether to move the illumination. More specifically, the illumination position update unit 307 acquires a state of the flag SW2. In a case where the flag SW2 is ON (YES in step S709), the processing proceeds to step S710. In a case where the flag SW2 is OFF (NO in step S709), the processing proceeds to step S713.

In step S710, the illumination position acquisition unit 306 acquires the values of the parameters θ and ϕ for representing the position of the illumination.

In step S711, the specified position acquisition unit 304 acquires the press-start position P1' and the press-end position P2' which can be acquired through the drag operation of the user. For example, a start position and an end position of the drag operation executed by the user on the display unit 106 are respectively expressed as the press-start position P1' and the press-end position P2'.

In step S712, the illumination position update unit 307 updates the position of the illumination. First, the illumination position update unit 307 calculates a start position P1=(i1, j1) and an end position P2=(i2, j2) on the color image data corresponding to the press-start position P1' and the press-end position P2', respectively. Then, according to the following formula (5), the illumination position update unit 307 calculates the amounts of change Δθ and Δϕ of the parameters θ and ϕ.

$$\Delta\theta = \frac{90°}{A}(i_2 - i_1) \quad (5)$$

$$\Delta\phi = \frac{90°}{B}(j_2 - j_1)$$

$$A = \frac{W}{2C_z\tan(u/2)}a$$

$$B = \frac{H}{2C_z\tan(v/2)}b$$

Herein, a value A corresponds to the radius "a" of the ellipsoid for representing the movable range of the illumination on the color image data 501. A value B corresponds to the radius "b" of the ellipsoid for representing the movable range of the illumination on the color image data 501. An illumination parameter Cz can be acquired from the object position P0 according to the formula (4). A value W represents the number of horizontal pixels in the color image data 501. A value H represents the number of vertical pixels in the color image data 501. A value u represents a horizontal field angle of the imaging apparatus 101. A value v represents a vertical field angle of the imaging apparatus 101.

The values of the parameters θ and ϕ are updated by adding the amounts of change Δθ and Δϕ calculated in the above manner to the parameters θ and ϕ for representing the position of the illumination acquired from the illumination position acquisition unit 306. Thereafter, based on the updated parameters θ and ϕ, the illumination position update unit 307 updates the position Q of the illumination according to the formula (2), and updates the orientation U of the illumination according to the formula (3). The updated position of the illumination will be described with reference to FIG. 10. When a current position of the illumination is the initial position 1003 while the press-start position P1' is the selected object position P0' (801) and the press-end position P2' is a position E1 (1001), the position and orientation of the illumination are updated to a position Q1 (1005) and an orientation U1 (1006). Further, when a current position of the illumination is the initial position 1003 while the press-start position P1' is the selected object position P0' (801) and the press-end position P2' is a position E2 (1002), the position and orientation of the illumination are updated to a position Q2 (1007) and an orientation U2 (1008).

Figure 11:
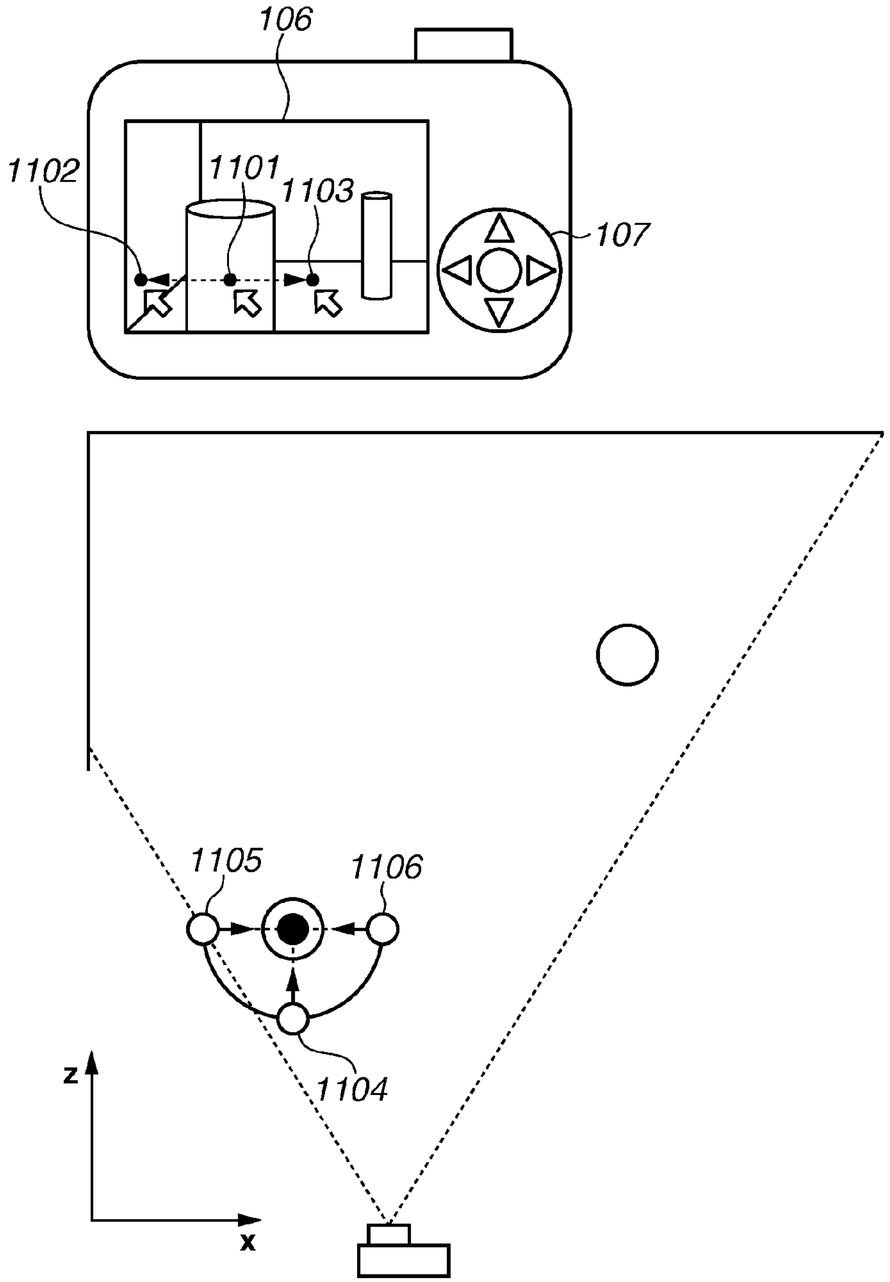
FIG. 11 is a diagram illustrating an example of processing for moving the illumination according to the first exemplary embodiment.
Figure 12:
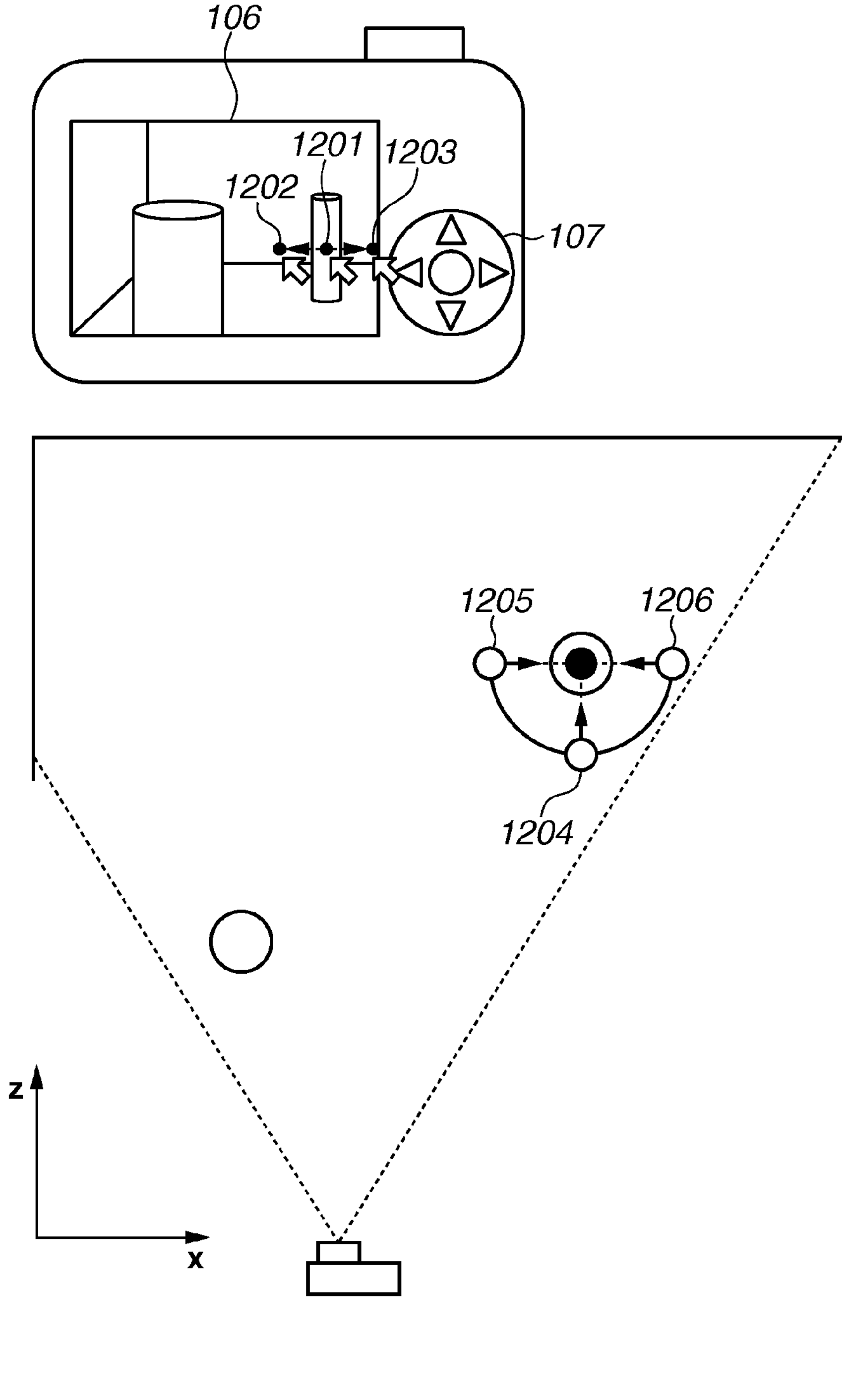
FIG. 12 is a diagram illustrating another example of processing for moving the illumination according to the first exemplary embodiment.

As described above, by setting the amounts of change Δθ and Δϕ of the parameters θ and ϕ based on the object position P0, the user can perform an intuitive operation according to the position of the object. More specifically, the updated position of the illumination when the user selects a close object and the updated position of the illumination when the user selects a distant object will be described with reference to FIGS. 11 and 12, respectively. When the user selects a point 1101 to set the illumination for a close object, the position of the illumination is updated from an initial position 1104 to a position 1105 by setting the press-start position P1' to the point 1101 and the press-end position P2' to a point 1102. Further, by setting the press-start position P1' to the point 1101 and the press-end position P2' to a point 1103, the position of the illumination is updated from the initial position 1104 to a position 1106. When the user selects a point 1201 to set the illumination for a distant object, the position of the illumination is updated from an initial position 1204 to a position 1205 by setting the press-start position P1' to the point 1201 and the press-end position P2' to a point 1202. Further, by setting the press-start position P1' to the point 1201 and the press-end position P2' to a point 1203, the position of the illumination is updated from the initial position 1204 to a position 1206. As described above, by making a moving amount of the drag operation necessary to change the parameters θ and ϕ greater for a closer object, the user can operate as if the illumination were positioned on the selected position of the display unit 106. In addition, limitations may be placed on the values of the parameters θ and ϕ for representing the position of the illumination. For example, the values of the parameters θ and ϕ are set within the ranges of "θmin≤θ≤θmax" and "ϕmin≤ϕ≤ϕmax", respectively, so that the values thereof are adjusted to fall within the above ranges in a case where the parameters θ and ϕ are updated by the amounts of change Δθ and Δϕ to the values exceeding the ranges.

In step S713, the illumination position update unit 307 determines whether to change the on/off state of the illumination based on the operation of the user. In a case where the on/off state of the illumination is to be changed (YES in step S713) the processing proceeds to step S714. In a case where the on/off state is not to be changed (NO in step S713), the illumination position update unit 307 ends the illumination parameter setting processing.

In step S714, the illumination position update unit 307 changes the on/off state of the illumination. More specifically, after acquiring the state of the variable SW_L2 from the RAM 204, the illumination position update unit 307 changes the state of the illumination to OFF if the variable SW_L2 is ON, and changes the state thereof to ON if the variable SW_L2 is OFF. Then, the illumination position update unit 307 ends the illumination parameter setting processing.

<Lighting Processing>

Herein, the lighting processing executed in step S411 will be described. In the present exemplary embodiment, the corrected image data I' is generated according to the following formula (6).

$$I'_r(i,j) = I_r(i,j) + \sum_m k_m(i,j) L_{r,m} I_r(i,j) \quad (6)$$

$$I'_g(i,j) = I_g(i,j) + \sum_m k_m(i,j) L_{g,m} I_r(i,j)$$

$$I'_b(i,j) = I_b(i,j) + \sum_m k_m(i,j) L_{b,m} I_r(i,j)$$

In the above, values I'r, I'g, and I'b represent the pixel values of the corrected image data I', values Lrm, Lgm, and Lbm represent the color of the m-th illumination, and a value km represents a correction degree with respect to the m-th illumination. The correction degree km (i, j) is determined based on the distance value P (x, y) and the normal vector N (x, y) which correspond to the brightness α, position Q, and orientation U of the illumination and the pixel (x, y). For example, the correction degree km (i, j) can be acquired by the following formula (7).

$$k(i,j) = \alpha K(\rho) \frac{N(i,j) \cdot V(i,j)}{W(P(i,j),Q)} \quad (7)$$

A function W returns a greater value as a distance between the object position P and the position Q of the illumination increases. A value ρ represents an angle formed by a vector heading toward the object position P (i, j) from the position Q of the illumination, and the orientation U of the illumination. A function K returns a greater value as the value ρ decreases. A unit vector V (i, j) represents a direction heading toward the position Q of the illumination from the object position P (i, j). However, the value k is 0 in a case where either the variable SW_L1 or SW_L2 for the illumination is OFF. By generating the corrected image as described in the present exemplary embodiment, the brightness can be corrected according to the position of the illumination and the shape of the object.

Further, although a movable range of the illumination is set to the ellipsoid expressed by the formula (1) as described in step S705, the movable range of the illumination is not limited to the above. For example, the movable range may be set so that the illumination moves on a plane that is at a predetermined distance from the object.

Figure 13:
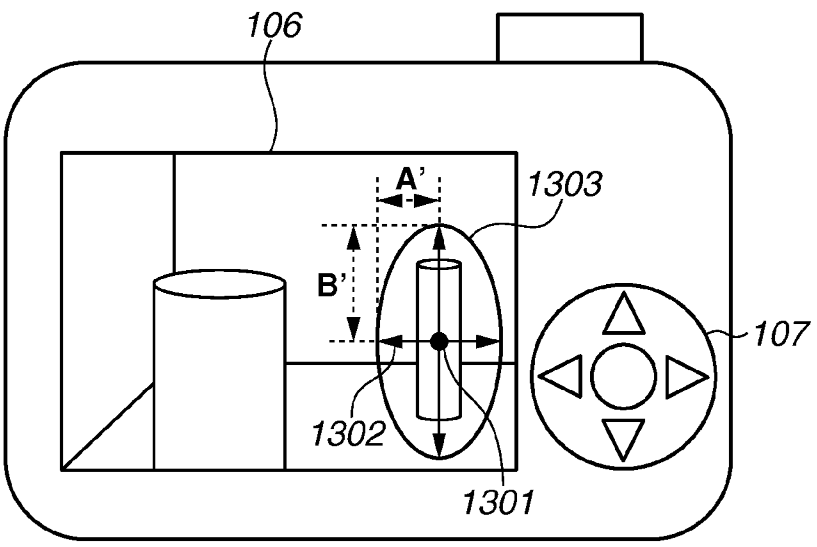
FIG. 13 is a diagram illustrating an example of a displayed image according to the first exemplary embodiment.

Furthermore, as illustrated in FIG. 13, a region corresponding to the movable range of the illumination may be displayed on the display unit 106. For example, an arrow-shape symbol 1302 may be displayed on the display unit 106 together with a selected object position 1301 by calculating the movable ranges A' and B' of the illumination on the display screen based on the values A and B acquired by the formula (5). Alternatively, an ellipse 1303 having the selected object position 1301 at the center and having radiuses corresponding to the movable ranges A' and B' may be displayed on the display unit 106. With this configuration, the user can intuitively understand the movable range of the illumination.

As described above, when the user selects a position on the image data, the user can observe an image that looks as if it had been captured with the illumination arranged in the selected position. Further, when the user inputs an operation for moving the illumination, the illumination is moved according to the operation while the degree of illumination applied to the object in the captured image is changed and displayed. By executing the lighting processing and displaying the illumination condition, in the image processing apparatus that generates from a captured image another image that looks as if the object had been captured under a desired illumination condition, the user can easily set the position and orientation of the illumination.

Figure 14:
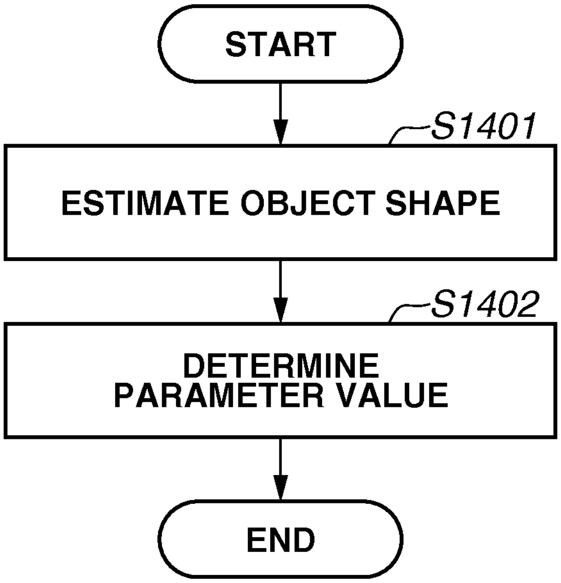
FIG. 14 is a flowchart illustrating a flow of processing for setting a movable range according to a second exemplary embodiment.

In the first exemplary embodiment, to set the movable range of the illumination, the parameter values a, b, and c are determined based on prescribed values, not based on the object. In a method described in a second exemplary embodiment, the above-described parameter values are determined based on the shape of the object so that the movable range of the illumination is set depending on the object. A detailed description about the configuration similar to that of the above-described exemplary embodiment will be omitted. In the present exemplary embodiment, the processing for setting the movable range executed in step S705 is different from that described in the first exemplary embodiment. A flow of processing for setting the movable range (in step S705) according to the present exemplary embodiment is illustrated in FIG. 14.

Figure 15:
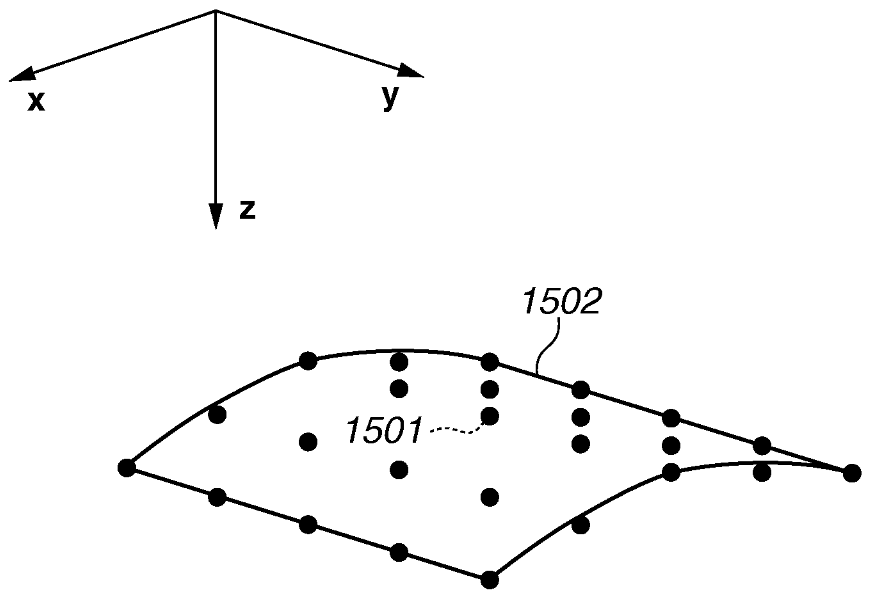
FIG. 15 is a diagram illustrating an example of fitting a quadric surface according to the second exemplary embodiment.

In step S1401, the illumination movable range setting unit 305 estimates shape information indicating a shape of the object based on the distance image data 502, the object position P0 (802), and the object proximal region 803. More specifically, as illustrated in FIG. 15, the illumination movable range setting unit 305 fits a quadric surface 1502 to coordinate values 1501 of the pixels included in the object proximal region 803 acquired from the distance image data. For example, the quadric surface can be fitted thereto by employing a least-square method. In this case, half-values of diameters in the x-axis, y-axis, and z-axis directions of the quadric surface are expressed as Rx, Ry, and Rz, respectively. Although the values Rx, Ry, and Rz have been calculated by fitting the quadric surface 1502, limitations may be placed thereon in order to keep the respective values of Rx, Ry, and Rz within the prescribed values. For example, when the object has an approximately planar shape, a curvature radius is extremely large and as a result, the operation of the user may be difficult because the moving range of the illumination is extremely wide. In such a case, any of the values Rx, Ry, and Rz exceeding the prescribed value may be replaced with Rx', Ry', or Rz'. Through this operation, the moving range of the illumination can be restricted even if the object has an approximately planar shape.

Further, depending on the shape of the object, there may be a case where a solution cannot be stably acquired when the quadric surface 1502 is to be fitted. Therefore, at least one of the values Rx, Ry, and Rz may be set as a prescribed value. For example, the half-value Rz of a diameter in the z-axis direction parallel to the optical axis direction may be set as a prescribed value Rz" to acquire the rest of the half-values Rx and Ry. With this configuration, the values Rx, Ry, and Rz can be stably acquired. Furthermore, the number of axes to be set as the prescribed values may be changeable by the operation of the user.

In step S1402, based on the object coordinate value 901 and the values Rx, Ry, and Rz acquired in step S1401, the illumination movable range setting unit 305 sets the illumination parameters according to the formula (4).

Figure 16:
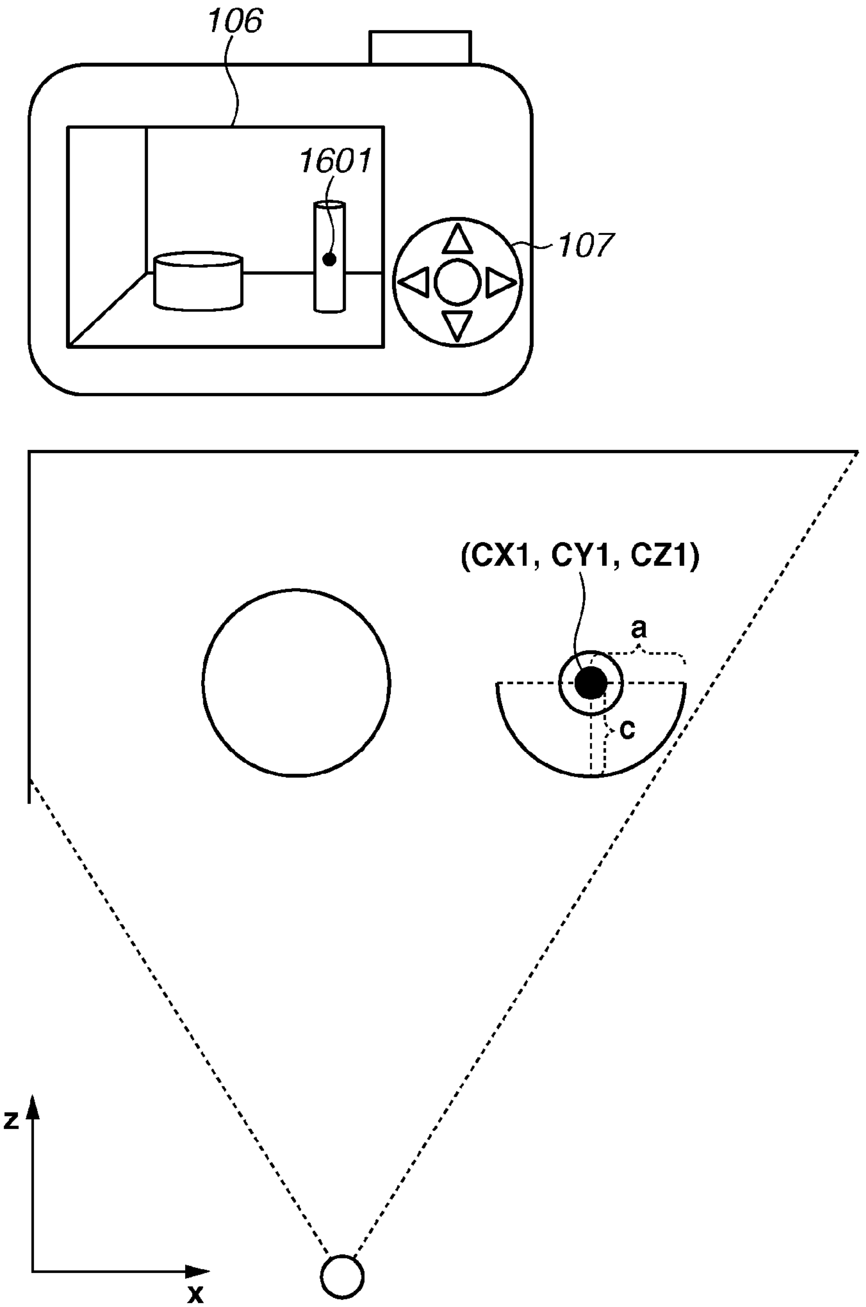
FIG. 16 is a diagram illustrating an example of a setting result of the illumination according to the second exemplary embodiment.

As described above, the movable range of the illumination can be set according to the shape of the object. With this configuration, as illustrated in FIG. 10, in a case where an object extending across an x-z plane is selected with the selected object position 801, the moving range of the illumination on the x-z plane is greater. On the other hand, as illustrated in FIG. 16, in a case where an object having a small size on the x-z plane is selected with the selected object position 1601, the moving range of the illumination on the x-z plane is smaller. As a result, the moving range of the virtual illumination can be set so that the virtual illumination moves naturally around the periphery of the object with respect to the shape of the object.

In the above-described exemplary embodiment, a position of the illumination specified by the user has been acquired as the press-start position and the press-end position by receiving the drag operation of the user executed on the display screen. However, in addition to the press-start (drag-start) position and the press-end (drag-end) position, a position touched by the user may be periodically detected and acquired as the specified position of the illumination in order to update the illumination parameters. With this configuration, illumination using the virtual illumination can be displayed consecutively, so that the user can operate as if the user made an illumination adjustment to the object by moving actual illumination in imaging target space. Further, the specified position of the illumination may be acquired by an operation other than the drag operation. For example, the image processing apparatus may receive setting of a lighting mode, so that all the positions touched by the user through the touching operation in the lighting mode may be acquired as the specified positions with respect to the illumination. In this case, the illumination with respect to the object will be changed each time the user changes the touched position.

Further, in the above-described exemplary embodiment, an object on which the lighting processing is executed is selected and then the illumination parameters are set by setting the movable range of the illumination according to the position of the object. However, the lighting processing may be executed on a plurality of objects. For example, the movable range of the illumination is previously calculated for each of the objects. At this time, the movable range of the illumination is calculated based on the size and position of the object. In a case where the object is placed on the front (near) side or the object is large in size, the movable range of the illumination is set to be greater. In a case where the object is placed on the back (far) side or the object is small in size, the movable range of the illumination is set to be smaller. When the image processing apparatus acquires the specified position of the illumination through the operation of the user, the image processing apparatus executes the lighting processing by setting the illumination at the position specified by the user in the movable range set for each of the objects. With this configuration, the lighting correction can be executed on a plurality of the objects.

Further, in a case where a plurality of objects is obviously placed on the same position, the movable range of the illumination may be determined according to the size of the object. For example, in a case where the lighting processing is executed on an object larger than the other objects placed on the same position, the movable range of the illumination corresponding to that object is set to be greater than a reference value of the movable range of the illumination. On the other hand, in a case where the lighting processing is executed on an object smaller than the other objects, the movable range of the illumination corresponding to that object is set to be smaller than the reference value of the movable range of the illumination. With this configuration, as with the case of the above-described exemplary embodiment, the user can naturally execute the lighting processing.

Furthermore, a configuration in which the movable range of the illumination is set based on only the object position and a configuration in which the movable range of the illumination is set based on the position, shape, and size of the object may be used in combination with each other. In particular, when an object as a lighting processing target is limited to a person, parameters for defining the movable range (i.e., a size of an ellipsoid) of the illumination is set in advance based on the average shape and size. With this configuration, when the position of the object is acquired, the movable range of the illumination may be simply set only by identifying the central position of the illumination. Alternatively, a size of the movable range of the illumination corresponding to each of a plurality of objects may be previously set, so that the predetermined size of the movable range is employed based on the information for identifying the object.

According to the exemplary embodiments of the present invention, in the image processing apparatus that generates from a captured image another image that looks as if it had been captured under a desired illumination condition, the position and orientation of illumination can be easily set.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-074576 filed Mar. 31, 2014, and Japanese Patent Application No. 2015-037435 filed Feb. 26, 2015, which are hereby incorporated by reference herein in their entireties.

What is claimed is:

1. An image processing apparatus for using virtual illumination to perform lighting processing on image data displayed on a display screen, the image processing apparatus comprising:

a memory for storing data; and at least one processor coupled to the memory, the at least one processor operating to:

identify an object in the image data;

acquire position information indicating a position of the object in a three-dimensional space;

set, based on the position information of the object, a movable range in the three-dimensional space in which a position of the virtual illumination can be set;

acquire a specified position input by a user on the display screen;

determine the position of the virtual illumination based on the movable range and the specified position; and perform lighting processing on the object in the image data based on the position of the virtual illumination determined by the at least one processor.

2. The image processing apparatus according to claim 1, wherein the at least one processor sets a size of the movable range based on shape information of the object.

3. The image processing apparatus according to claim 2, wherein the at least one processor sets, as the movable range of the virtual illumination, an ellipsoid centered about a coordinate position corresponding to the position information of the object and having radiuses set based on the shape information of the object.

4. The image processing apparatus according to claim 1, wherein a moving amount from a first position of the virtual illumination corresponding to a first specified position acquired by the at least one processor to a second position of the virtual illumination corresponding to a second specified position in the three-dimensional space different from the first specified position varies depending on the position of the object.

5. The image processing apparatus according to claim 1, wherein the at least one processor sets a size of the movable range of the virtual illumination based on a size of the object.

6. The image processing apparatus according to claim 1, wherein the at least one processor further determines an orientation of the virtual illumination based on the specified position.

7. The image processing apparatus according to claim 1, wherein the at least one processor receives a drag operation from the user and acquires an end position of the drag operation as the specified position.

8. The image processing apparatus according to claim 1, wherein the at least one processor receives a drag operation from the user, and acquires as the specified position a result of periodically detecting a position touched by a user.

9. An image processing method for using virtual illumination to perform lighting processing on image data displayed on a display screen, the image processing method comprising:

identifying an object in the image data;

acquiring position information indicating a position of the object in a three-dimensional space;

setting, based on the position information of the object, a movable range in the three-dimensional space in which a position of the virtual illumination can be set;

acquiring a specified position input by a user on the display screen;

determining the position of the virtual illumination based on the movable range and the specified position; and performing lighting processing on the object in the image data based on the determined position of the virtual illumination.

10. A non-transitory computer-readable storage medium storing a program that is read and executed by a computer to cause the computer to perform a method, the method comprising:

identifying an object in the image data;

acquiring position information indicating a position of the object in a three-dimensional space;

setting, based on the position information of the object, a movable range in the three-dimensional space in which a position of the virtual illumination can be set;

acquiring a specified position input by a user on the display screen;

determining the position of the virtual illumination based on the movable range and the specified position; and performing lighting processing on the object in the image data based on the determined position of the virtual illumination.

* * * * *